(12) United States Patent
Johnson et al.

(10) Patent No.: US 7,385,973 B1
(45) Date of Patent: Jun. 10, 2008

(54) METHOD AND APPARATUS FOR VLAN ID DISCOVERY

(75) Inventors: Trystan Johnson, Belleville (CA); Michael Pothier, Picton (CA); Robert Turnbull, Calgary (CA); Kejin Huang, Calgary (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1271 days.

(21) Appl. No.: 10/372,633

(22) Filed: Feb. 21, 2003

(51) Int. Cl.
*H04L 12/28* (2006.01)
(52) U.S. Cl. .................................... 370/389; 370/400
(58) Field of Classification Search .............. None
See application file for complete search history.

(56) References Cited

U.S. PATENT DOCUMENTS

| | | | |
|---|---|---|---|
| 5,968,126 A * | 10/1999 | Ekstrom et al. | 709/225 |
| 6,144,671 A | 11/2000 | Perinpanathan et al. | |
| 6,161,008 A | 12/2000 | Lee et al. | |
| 6,286,038 B1 | 9/2001 | Reichmeyer et al. | |
| 7,155,518 B2 * | 12/2006 | Forslow | 709/227 |

OTHER PUBLICATIONS

"802.1Q VLAN User's Guide," Cabletron Systems, Inc., 1998, pp. i—Index 2.

* cited by examiner

*Primary Examiner*—Robert W. Wilson
(74) *Attorney, Agent, or Firm*—Robert D. McCutcheon (57) ABSTRACT

A method and apparatus for a first network device to identify the VLAN for which the first network device is a member. In response to the broadcasting of a discovery request message by the first network device, a second network device transmits a first data message including VLAN information relating to the VLANs configured on the network. From the VLAN information, the first network device determines the VLAN ID of the VLAN in which the first network device is a member.

21 Claims, 5 Drawing Sheets

METHOD AND APPARATUS FOR VLAN ID DISCOVERY

TECHNICAL FIELD OF THE INVENTION

The present invention relates to VLANs and, in particular, to a method and apparatus for VLAN identification.

BACKGROUND

A Virtual Local Area Network (VLAN) is a group of network devices (such as PCs, servers, and other network resources and devices) that function as a single administratively configured LAN or broadcast domain. VLANs may be configured on single or different LAN sections, and may span multiple switches/routers, and even across Wide Area Network (WAN) links. Thus, the network devices associated with a specific VLAN may be separated by geography and location in the network. A VLAN is not a physical location, but a membership. Users located in separate areas or connected to separate ports may be assigned to a single VLAN group. In other words, a VLAN is a logical grouping of ports and end-stations such that all ports and end-stations for a given VLAN appear to be on the same physical (or extended) LAN segment even though each may be geographically separated.

One of the problems with VLANs is that VLAN-aware devices (or 802.1Q compliant devices) require programming of the VLAN ID in order for the device to transmit frames with the VLAN Tag (4 bytes, with twelve bits identifying the VLAN ID). Currently, the programming may be done manually or by another method that is proprietary in nature. One such method utilizes a proprietary ethernet protocol whereby the ethernet devices obtain VLAN IDs directly from their respective ethernet switch. The problems with such methods are the proprietary nature of the protocol and/or the added functionality needed within the switch.

Accordingly, there is needed a method and apparatus that automatically programs a VLAN ID into an IP/ethernet device without the need for additional functionality at the respective switch.

SUMMARY

According to the present invention, there is provided a method of programming a VLAN ID of a first network device connected to a network having a predetermined number of VLANs. The method includes sending a first discovery message from the network device, via a switch, to a second network device and receiving a first data frame from the second network device in response to the first discovery message, the first data frame comprising VLAN ID information relating to at least one predetermined VLAN. The VLAN ID information is extracted and saved for use in determining the VLAN ID of the first network device.

In another embodiment of the invention, there is provided a method of programming a VLAN ID of a first network device. The method includes receiving a first discovery message via a switch and outputting a first data frame in response to the first discovery message, the first data frame including VLAN ID information relating to at least one predetermined VLAN, the VLAN ID information for use in determining the VLAN ID of the first network device.

In yet another embodiment of the present invention, there is provided a system for programming a VLAN ID of a first network device. The system includes a switch for receiving a first discovery message from the first network device, and a second network device for receiving the first discovery message from the switch, and in response thereto, outputting a first data frame for receipt by the first network device. The first data frame includes VLAN ID information relating to at least one VLAN and the VLAN ID information to be used for determining the VLAN ID of the first network device.

In still another embodiment of the present invention, there is provided a network device having a processor operable for having the network device output a first discovery request for receipt by a second network device and receive a first data message in response to the first discovery message. The first data message includes VLAN information relating to at least one VLAN within a network. The network device further extracts and saves the VLAN information that includes a VLAN ID of a VLAN of which the network device is a member.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

VLANs, and in particular the IEEE 802.1Q standard for VLANs, were developed mainly to address the problem of the large bandwidth requirements needed to handle broadcast and multicast traffic in large networks. Broadcast and multicast traffic distributed to all devices in a LAN limits the size of the LAN and reduces performance. VLANs provide a method to localize traffic and improve security. Additional benefits include reducing the cost of handling user/member moves and changes, allowing formation of virtual workgroups and hosting centers, and increasing network performance by reducing unneeded broadcast and multicast traffic. Other benefits include restriction and prioritization of traffic.

To define a VLAN, the VLAN must have a unique identity. Individual ports are then assigned to the VLAN by associating a VLAN ID with each port of a switch/router. In addition, special ports (e.g. trunk) ports may need to be configured as members of every VLAN, in order to maintain VLANs across multiple switches. Though VLAN membership is typically based upon ports, a number of different strategies or VLAN assignment methods may exist, including configuration based upon MAC addresses and protocol type, and perhaps others.

For additional information on 802.1Q VLAN technology and operation, refer to "802.1Q VLAN User's Guide", Cabletron Systems, June 1998, which is incorporated herein by reference.

Figure 1:
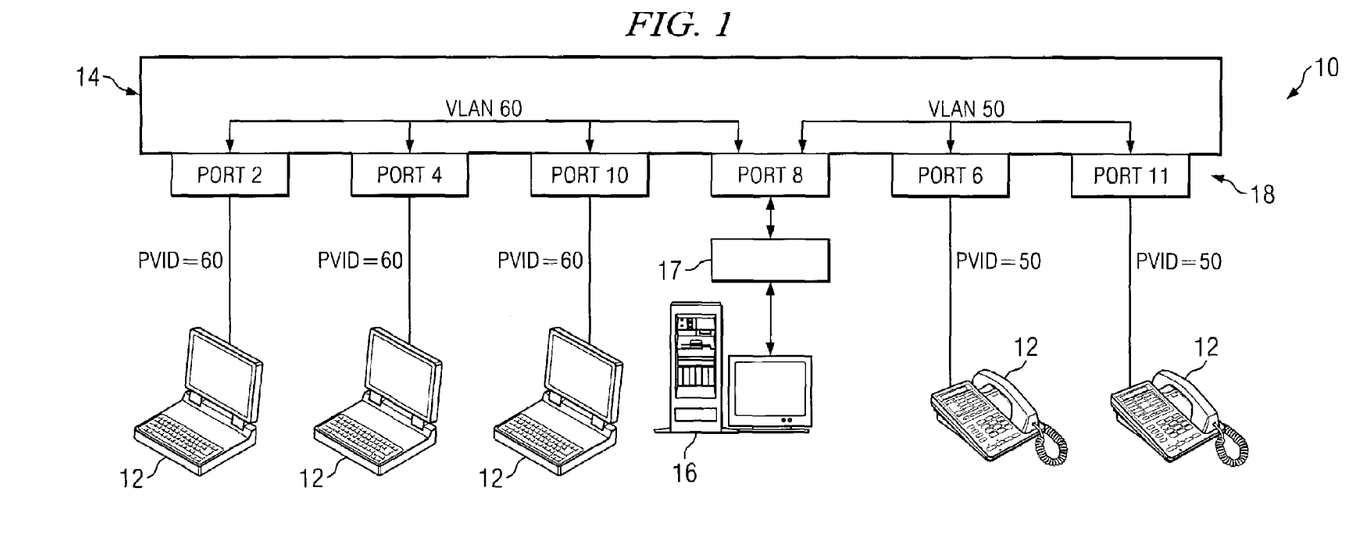
FIG. 1 is a block diagram of one embodiment of a network in which the present invention may be implemented.

Now referring to FIG. 1, there is shown a network 10 having a plurality of network devices 12 connected to a switch 14. The network devices may include personal computers (desktops, mobile, PDAs, etc.), phones, printers, servers, hubs, switches or any other device that may be connected within the network 10 and connected or coupled to the switch 14. A second network device 16 is also coupled to the switch 14. The switch 14 may include a single switch, router, or hub, or a plurality thereof, or combination of devices, for routing/switching etc. data packets within a network. Accordingly, the term "switch" used herein will refer to a switch, router, or any device that includes functionality operable to provide a switching or routing function. Connections from the network devices 12, 16 to the switch 14 may include any type of connection, including without limitation, wireline, wireless, optical, RF, and the like. In one embodiment, a relay agent 17 is provided for coupling the second network device 16 to the switch 14. The relay agent 17 may be a switch or router, or device with similar functionality. The relay agent refers to the hardware to perform the functionality, or the software for handling agent functionality, or both. In another embodiment (not shown), the relay agent 17 may be optional.

The switch 14 includes a plurality of ports 18. The switch 14 may include any number of ports, though for illustrative purposes only six ports are shown (identified as ports 2, 4, 10, 8, 6 and 11). Each network device 12, 16 is connected to a respective port of the switch 14. In the embodiment shown, the network devices 12 connected to ports (2, 4 and 10) are illustrated as computers while the network devices 12 connected to ports (6 and 11) are shown as digital phones. In one embodiment, the digital phones are internet or internet protocol phones and capable of communication, or interfacing, with a data network. The second network device 16 coupled (through the relay agent 17) to the port (8) is shown, in one embodiment of the present invention, as a server, and more particularly as a server capable of operating with the Dynamic Host Configuration Protocol (DHCP).

As will be appreciated, additional switches or network resources may be interconnected between the switch 14 and the second network device 16, including the relay agent 17. As will be appreciated, in one embodiment the switch 14 is a Layer-2 switch and the relay agent 17 is a Layer-3 switch.

In the embodiment shown in FIG. 1, the network 10 and the switch 14 have been configured into two VLANS (identified as VLANs 50 and 60). After the VLANs are created, individual ports are given membership in the associated VLAN. This is accomplished by associating a VLAN ID with each port on the switch 14. The association of the ports with specific VLAN IDs becomes the port VLAN ID (PVID). The PVIDs identify the particular VLAN into which untagged frames received into that port are classified. As illustrated, the PVIDs for ports (2, 4 and 10) are each identified as "60" and associated with the VLAN 60. Any untagged frames received into these ports will be classified as belonging to the VLAN 60. Membership in the VLAN 60 includes the network devices attached to the ports (2, 4, 10 and 8). The PVIDs for ports (6 and 11) are each identified as "50" and associated with the VLAN 50. Any untagged frames received into these ports will be classified as belonging to the VLAN 50. Membership in the VLAN 50 includes the network devices attached to the ports (8, 6, and 11). In the embodiment shown, the network devices 12 (computers) are associated with the VLAN 60 while the network devices 12 (phones) are associated with the VLAN 50.

The PVIDs are defaults for each port. Any untagged frames received into the port are classified as belonging the VLAN identified by the default PVID. Upon receipt of an untagged frame, the switch 14 will classify the untagged frame as belonging to the VLAN identified by the PVID for that particular port and distribute the frame to each of the ports (for output) associated to the identified VLAN (if the frame is a broadcast frame). Each port may be configured to transmit the frame either as tagged (with the VLAN ID) or untagged (the entry port or exit port may tag the frame, and if so, the frame will be tagged with the VLAN ID associated with the PVID for that particular port). In general terms, the switch 14 functions to classify received frames (untagged or tagged) into specific VLANs, and transmit the frames (either tagged or untagged) according to the VLAN membership.

The present invention provides a method (and apparatus) for the network devices 12 to discover the VLAN ID associated therewith (i.e., identify which VLAN the network device 12 is a member) as configured within the network 10. For purposes of illustration, we shall refer to the network device connected to the port (11), as shown in FIG. 1. The network device 12 broadcasts a discover request frame (untagged) which is received by the port (11) of the switch 14. The discover request message generally includes source and destination address information and message information, and may include other information as well. Because the discover request frame is untagged, the switch 14 associates the discover request frame with VLAN 50 (frame received at port (11), PVID=50), and the discover request frame is forwarded to the other ports (6 and 8) associated with VLAN 50, and transmitted out the ports. If the discover request message is untagged, the switch 14 (or the input port (11) or exit port (8)) will tag the message with the correct VLAN ID. In either case, the discover request message exiting the switch 14 will be tagged with the VLAN ID.

The tagged discover request message is received by the relay agent 17 and forwarded to the second network device 16. The network device 16 (coupled to the port (8) thru the relay agent 17) receives the discover request message (tagged or untagged), and in response, transmits an offer data message or frame to the relay agent 17 which is then forwarded to the switch 14. The offer data message or frame carries VLAN information relating to the VLAN configuration of the network 10 and/or the switch 14. The VLAN information may include all the VLAN IDs of the VLANs configured within the switch 14 and/or network 10.

The forwarded discovery request message may or may not include the VLAN ID tag information. In one embodiment, the relay agent 17 removes the VLAN ID tag from the discover request message and then forwards the message to network device 16. As will be appreciated, the relay agent 17 maintains or generates an association between the VLAN ID tag and the source address information in the discover request message (i.e., the source address of the switch 14 or network device 12). The discover request message (without a VLAN tag) is then forwarded to the second network device 16 using subnet information. The subnet information of the relay agent 17 associates a specific subnet with each VLAN ID. This allows the relay agent 17 to track and associate discover and offer messages transmitted to or received from the second network device 16 with the appropriate VLAN, further allowing the relay agent 17 to insert an appropriate VLAN tag to the offer message returned to the switch 14.

For example, a discover request message received with a VLAN ID=50 will be forwarded to the second network device 16 from a specific subnet configured or associated with the VLAN ID=50. In response, the second network device 16 transmits the offer data message to the relay agent 17. Since the messages are transmitted using specific subnet information, the relay agent 17 is able to determine the VLAN ID to associate with the offer data message. As a result, the relay agent 17 includes the VLAN ID tag with the offer data message, which is then transmitted to the switch 14.

In one embodiment of the present invention, the network device 16 is a server operable in accordance with the Dynamic Host Configuration Protocol (DHCP), and the discover request message is a DHCP DISCOVER message, while the offer data message is a DHCP OFFER message. DHCP is a protocol or method for dynamically assigning Internet Protocol (IP) addresses to devices on a network, and is well-known to those skilled in the art. Accordingly, DHCP permits the automatic configuration of IP parameters on network devices. A brief description of the general operation of DHCP will follow.

When a DHCP client boots, it transmits a DHCP DISCOVER message on each local subnet to which a client is connected (that is from all interfaces of the device hosting the DHCP client) to DHCP server(s) coupled to such networks. Each subnet DHCP server may then respond with a DHCP OFFER message that includes an available network IP address. The DHCP client receives one or more DHCP OFFER messages, and then selects one server from which to request a specific IP address, based on information within the DHCP OFFER messages. The DHCP client then broadcasts a DHCP REQUEST message to each of the DHCP servers, each of the DHCP REQUEST messages including a server identification to indicate the server selected. The DHCP server selected then responds to the DHCP REQUEST message with a DHCP ACKNOWLEDGE message containing the IP address information requested by the DHCP client. As will be appreciated, though not shown, more than one server 16 may be included within the network 10 and/or coupled to additional ports of the switch 14 (or thru a relay agent such as the relay agent 17).

In accordance with the present invention, the offer data message includes VLAN information allowing the network device 12 to determine a VLAN ID associated with that particular network device 12 as configured within the network 10 (or the switch 14). In an exemplary embodiment, the VLAN information (VLAN IDs) is inserted within one of the data fields of the offer data message, and more particularly, may be placed in a vendor/site specific field. The network device 12 extracts and stores the VLAN information from the received DHCP OFFER message. It will be understood that the server 16 is configured with the VLAN information and programmed to include this information within the standard DHCP protocol operation.

After receiving the DHCP OFFER message, the network device 12 may continue with the remainder of the standard DHCP operation (including DHCP REQUEST, DHCP ACKNOWLEDGE, etc.) until an IP address is assigned, and thereafter, the network device 12 may immediately release the IP address. The completion of the remainder of the standard DHCP operation is optional. Upon receipt of the VLAN information, the network device 12 may, alternatively, cancel or terminate the DHCP operation. However, it may be advantageous to complete the DHCP cycle. As will be appreciated, the use of DHCP illustrates one embodiment of the present invention, and additional or generic protocols may be utilized.

After the offer data message (containing the VLAN information) is received, the network device 12 has knowledge of the VLAN IDs within the network 10 or switch 14. In the illustrative embodiment shown in FIG. 1, the received VLAN information will include two VLAN IDs (ID=50, 60). For each VLAN ID, the network device 12 prepares and transmits a new discovery request message in a frame tagged with that particular VLAN ID. Accordingly, two discovery request messages are received at the port (11) of the switch 14—one message tagged with VLAN ID=50 and another message tagged with VLAN ID=60.

Due to the VLAN configuration of the switch 14, the port (11) only allows registered frames to pass through the port. Registered frames are those frames that are untagged, or tagged with the appropriate associated VLAN ID, and in this embodiment, the VLAN ID associated/configured with port (11) is VLAN ID=50. Therefore, the discover request message tagged with VLAN ID=60 is discarded and not propagated through the switch 14, while the discover request message tagged with VLAN ID=50 is accepted and delivered to the port (8) for eventual receipt by the server 16 (associated with VLAN ID=50). Only one of the two discover request messages is transmitted to the server 16, and the basic operation of the server protocol (including offer, request and acknowledgment) continues until assignment of IP address to the network device 12. Accordingly, because only the appropriate message (with the VLAN ID tag associated with port) was allowed to filter through the port (11), the network device 12 is able to determine that the VLAN ID=50 is the appropriate VLAN ID for itself. Once determined, the network device 12 stores its VLAN ID in memory, associative to the VLAN for which it is a member.

The network device 12 distinguishes between the discovery request messages by transmitting them consecutively (with sufficient time to receive the data offer message in response) or assigning an xid to each discovery request message. Other methods may be employed to allow the network device to associate the returned data offer message with the correct discovery request message.

As will be appreciated, if the network device 12 is configured within the network 10 (or the switch 14) to belong to more than one VLAN, the present invention further allows for such embodiment, as multiple offers from the server 16 will be received, and the additional VLAN IDs for the associated VLANs will be determined.

In another embodiment, the relay agent 17 does not remove the VLAN ID tag from the discover request message (or alternatively inserts the VLAN ID as part of the data message or within a different field (not the VLAN ID tag field)), and then forwards the message. In this embodiment, the server 16 receives VLAN ID information and responds by transmitting an offer data message that includes the originating VLAN ID information. This provides a means for the relay agent 17 to forward the offer data message to the proper destination (VLAN). In other words, the server 16 receives a discovery request message that includes a VLAN tag identifying the VLAN from which the message was received, and in response, the server 16 sends an offer data message that includes the originating VLAN information.

This may occur in one of several ways. First, the server 16 may tag the offer data message with the VLAN ID, thus providing the network device 12 with the VLAN ID information (the offer data message may also include the full VLAN information in one of the data fields). Upon receipt of the offer data message, the network device 12 stores the VLAN ID information. Second, if untagged, the offer data message may include all the VLAN information within one of the data fields. If done in this manner, the network device 12 engages in additional steps, as described above, to determine the specific VLAN ID to associate with itself from the group of VLAN IDs in the VLAN information data. Third, if untagged, the offer data message may include the originating VLAN ID within one of the data fields, though this may necessitate additional functionality at the server 16 to insert the VLAN ID within the VLAN information field of the offer data message.

The present invention as described above may be useful when each port of the switch 14 is connected to a single network device 12 or configured to have one PVID and includes only network devices configured as members of the VLAN associated with the PVID (i.e, no network devices configured on another VLAN).

Figure 2:
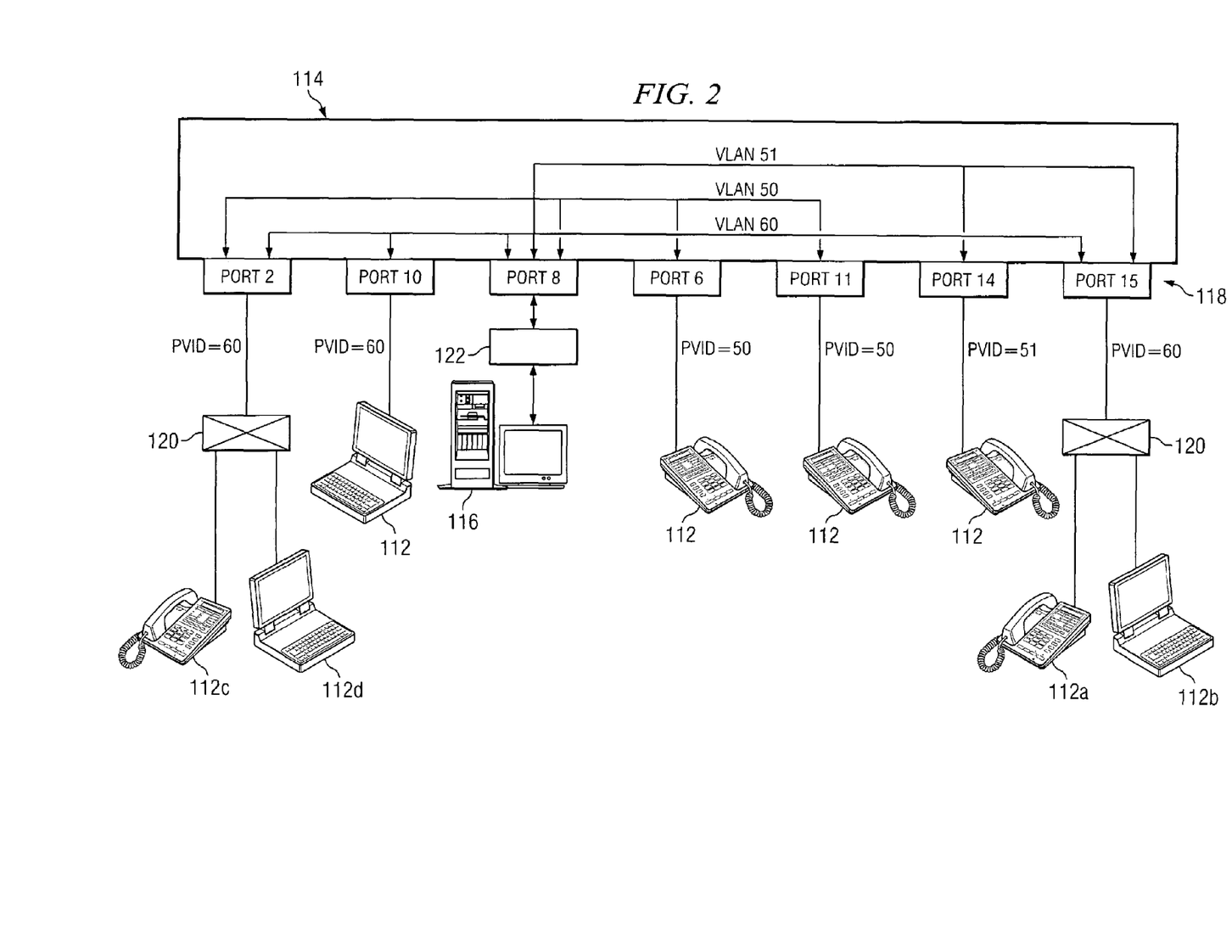
FIG. 2 is a block diagram of an alternative embodiment of a network in which the present invention may be implemented.

Now with reference to FIG. 2, there is shown a second embodiment of the present invention illustrating a network 110 having a plurality of network devices 112 connected to a switch 114. A second network device 116 is also coupled to the switch 114 via an interconnected second switch 122 or relay agent. The relay agent refers to the hardware to perform the functionality, or the software for handling agent functionality, or both. The elements shown in FIG. 2 are similar to those shown and described in FIG. 1. However, the network 110 includes a three-port switch 120 that interconnects two network devices 112*a*, 112*b* (illustrated as a phone and computer, respectively) with the port (15) of the switch 114, and another three-port switch 120 that interconnects two network devices 112*c* and 112*d* (illustrated as a phone and computer, respectively) with the port (2) of the switch 114. Further shown are ports (14, 15) and network devices 112 connected therewith (and port (4) is not shown). As will be appreciated, in one embodiment the switch 114 is a Layer-2 switch and the second switch 122 is a Layer-3 switch.

In the embodiment shown in FIG. 2, the network 110 and the switch 114 have been configured into three VLANS (identified as VLANs 50, 51 and 60). As illustrated, the PVIDs for ports (6 and 11) are each identified as "50" and associated with the VLAN 50. Any untagged frames received into these ports will be classified as belonging to the VLAN 50. Membership in the VLAN 50 includes the network devices attached to the ports (6 and 11). The VLAN 50 membership also includes the network device 112*c* (shown as a phone).

The PVIDs for ports (2, 10 and 15) are each identified as "60" and associated with the VLAN 60. Any untagged frames received into these ports will be classified as belonging to the VLAN 60. Membership in the VLAN 60 includes the network devices attached to the port (10). The VLAN 60 membership also includes the network devices 112*b* and 112*d* (shown as computers attached to ports (15 and 2), respectively). Network devices 112*a* and 112*c* (shown as phones) are members in the VLAN 51 and VLAN 50, respectively. Assuming the network devices 112*a* and/or 112*c* transmit untagged frames, the frames will be classified as belonging to VLAN 60, not VLAN 51 or VLAN 50, respectively.

In the embodiment shown, the port (2) of the switch 114 has a default VLAN ID (PVID=60) while the network devices 112*c*, 112*d* attached thereto are members of VLAN 50 and VLAN 60, respectively. The port (15) of the switch 114 has a default VLAN ID (PVID=60) while the network devices 112*a*, 112*b* attached thereto are members of VLAN 51 and VLAN 60, respectively.

The PVID for port (14) is identified as "51" and associated with the VLAN 51. Any untagged frames received into this port will be classified as belonging to the VLAN 51. Membership in the VLAN 51 includes the network device attached to the port (14). The VLAN 51 membership also includes the network device 112*a* (shown as a phone).

When multiple network devices 112 are connected to a single port, and it is desired to configure each of the network devices for a different VLAN, such as network devices 112*a*, 112*b*, 112*c*, 112*d* coupled to the three-port hubs 120, automatic discovery of the VLAN IDs associated with network devices, and in particular devices 112*a* and 112*c*, may be accomplished as described below.

It will be appreciated that although only two configurations of VLANs in a network (FIGS. 1 and 2) have been illustrated, numerous different configurations and alternative arrangements may be utilized in accordance with the present invention.

For the VLAN configurations as shown in FIGS. 1 and 2, and other configurations, it would be advantageous to have the capability to automatically program, with little or no manual intervention, the network devices 12, 112 with the appropriate VLAN ID that identifies the particular VLAN for which the network device is configured. Moreover, utilizing standard resources of the network, instead of adding additional functionality within the switch(es) and/or using proprietary protocols, to discover and program the appropriate VLAN ID associated with the specific network device would be advantageous. The present invention will save setup time for network devices, especially when a significant number of VLAN-aware devices are being deployed within the network. In addition, it allows a network administrator to frequently re-configure VLANs, when needed.

Figure 3A:
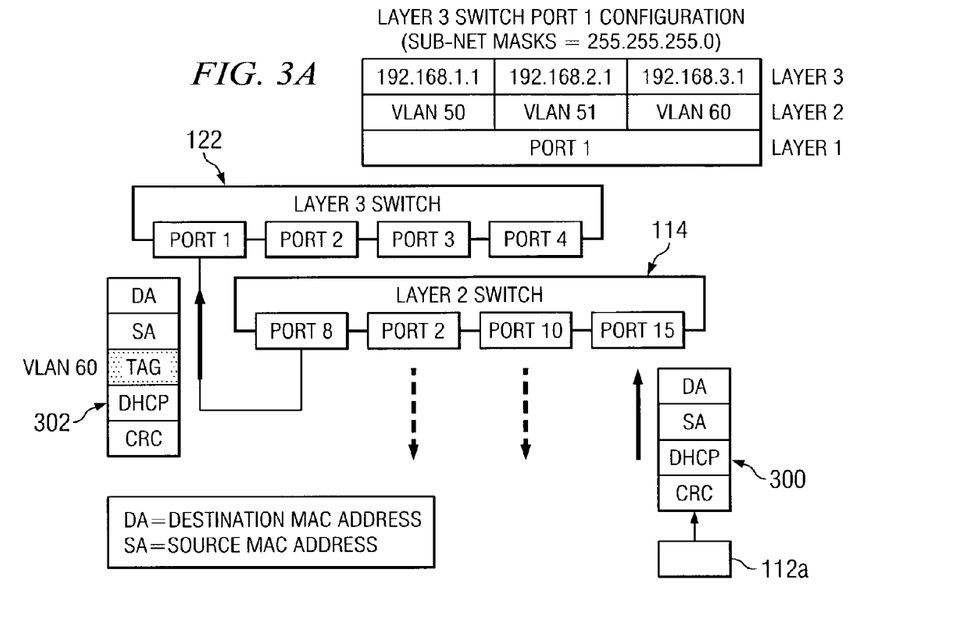
FIGS. 3A through 3F detail a flow diagram illustrating a method of VLAN ID discovery and programming for a network device according to one exemplary embodiment of the present invention.

Now referring to FIGS. 3A thru 3F, there is illustrated a flow diagram of one embodiment of the method in accordance with the present invention. For purposes of illustration, we shall refer to the network device 112*a* connected to the port (15), as shown in FIG. 2. With reference to FIG. 3A, the network device 112*a* broadcasts a discover request message or frame (untagged) 300 which is received by the port (15) of the switch 114. The discover request message 300 includes source address (SA), destination address (DA), data (identified as "DHCP"), and error correction (identified as "CRC") information within the frame. In one embodiment, the source and destination addresses are source and destination MAC addresses. As will be appreciated, more or less information/data may be included within the message 300.

Because the discover request frame 300 is untagged, the switch 114 associates the discover request frame with VLAN 60 (frame received at port (15), PVID=60). As the discover request message 300 is a broadcast message, the message 300 is transmitted out all ports associated with VLAN 60, including the port (8). Prior to output, the switch 114 tags the original discover request message 300 to generate a tagged discover request message 302 that is then output through the port (8) to the relay agent or switch 122. In this embodiment, the switch 122 receives a discovery request message with a VLAN tag.

Figure 3B:
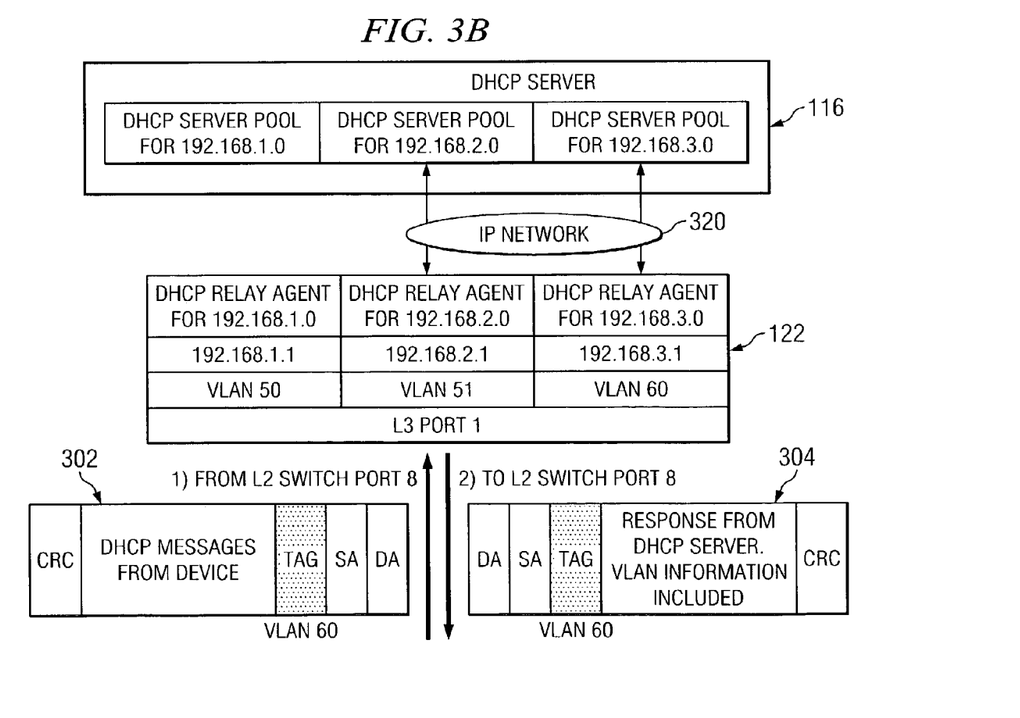

With reference to FIG. 3B, the discovery request message 302 received by the switch 122 is forwarded via a data network 320 to the network device 116 (with or without a VLAN tag, not shown) using subnet information. Alternatively, the data network 320 may be omitted (direct connection) or may include additional devices interconnected therein. The switch 122 includes configuration information relating particular VLANs to corresponding subnets. When the discover request message 302 is forwarded to the network device 116, the subnet information is utilized to identify or associate a response from the network device 116 with the appropriated VLAN. As shown, the message 302 is forwarded from a specific subnet (192.168.3.0).

After receipt of the discover request message 302, the network device 116 responds by outputting an offer data message or frame (details not shown) to the switch 122 using the identified subnet information. The switch 122 associates the received message with VLAN 60, tags the message with the VLAN 60 tag and outputs a tagged offer data message or frame 304, as shown. The offer data message 304 carries VLAN information relating to the VLAN configuration of the network 110 and/or the switch 114. The VLAN information may include all the VLAN IDs of the VLANs configured within the switch 114 and/or network 110.

Figure 3C:
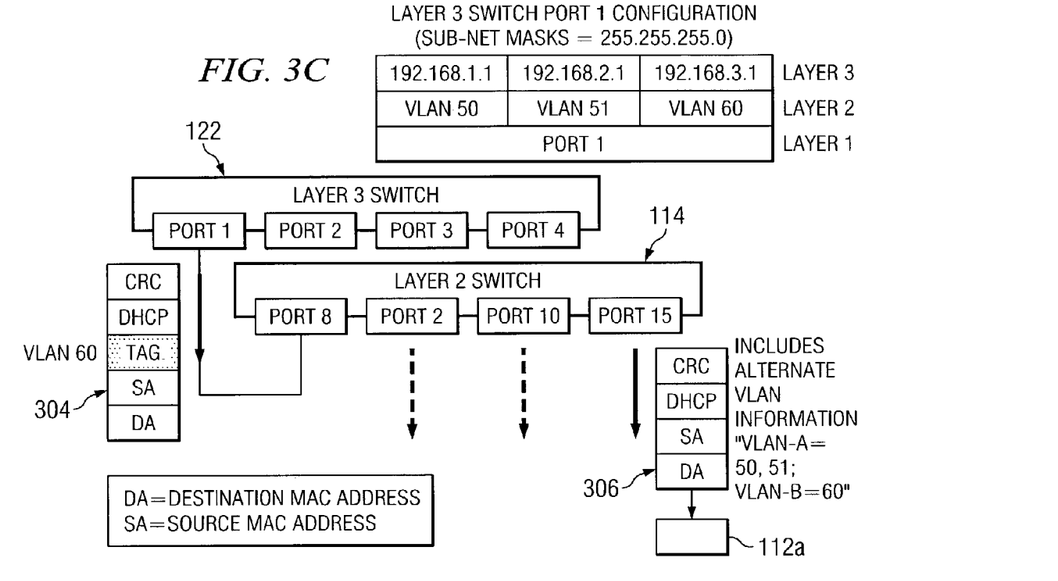

Now referring to FIG. 3C, the offer data message 304 (tagged with VLAN 60), including the VLAN information therein, is transmitted from the switch 122 and received at the port (8) of the switch 114. The switch 114 removes the VLAN tag and outputs an offer data message 306 to all ports of the switch 114 (because the offer data message output from the network device 116 is a broadcast message) or the ports associated with VLAN 60, as shown. Alternatively, the VLAN tag may be left intact within the message and the message output to those ports associated with VLAN 60.

In one embodiment of the present invention, the network device 116 is a server operable in accordance with the Dynamic Host Configuration Protocol (DHCP), and the discover request message is a DHCP DISCOVER message, and the offer data message is a DHCP OFFER message.

The DHCP OFFER message includes VLAN information which allows the network device 112a to determine a VLAN ID associated with that specific network device 112a as configured within the network 110 (and/or the switch 114). In an exemplary embodiment, the VLAN information (VLAN ID(s)) is inserted within one of the data fields of the offer data message, and more particularly, may be placed in a vendor/site specific field. The network device 112a extracts and stores the VLAN information from the received DHCP OFFER message. It will be understood that the server 116 is configured with the VLAN information and programmed to include this information within the standard DHCP protocol operation.

After receiving the DHCP OFFER message 306, the network device 112a may continue with the remainder of the standard DHCP operation (including DHCP REQUEST, DHCP ACKNOWLEDGE, etc.) until an IP address is assigned, and thereafter, the network device 112a may immediately release the IP address (not shown). The completion of the remainder of the standard DHCP operation is optional. Upon receipt of the VLAN information, the network device 112a may, alternatively, cancel or terminate the DHCP operation. It may be advantageous, however, to complete the DHCP cycle. As will be appreciated, the use of DHCP illustrates one embodiment of the present invention, and additional or generic protocols may be utilized.

After the offer data message 306 (containing the VLAN information) is received, the network device 112a has knowledge of the VLAN IDs within the network 110 and/or switch 114. In the illustrative embodiment shown as configured in FIG. 2, the received VLAN information will include three VLAN IDs (ID=50, 51, 60).

Figure 3D:
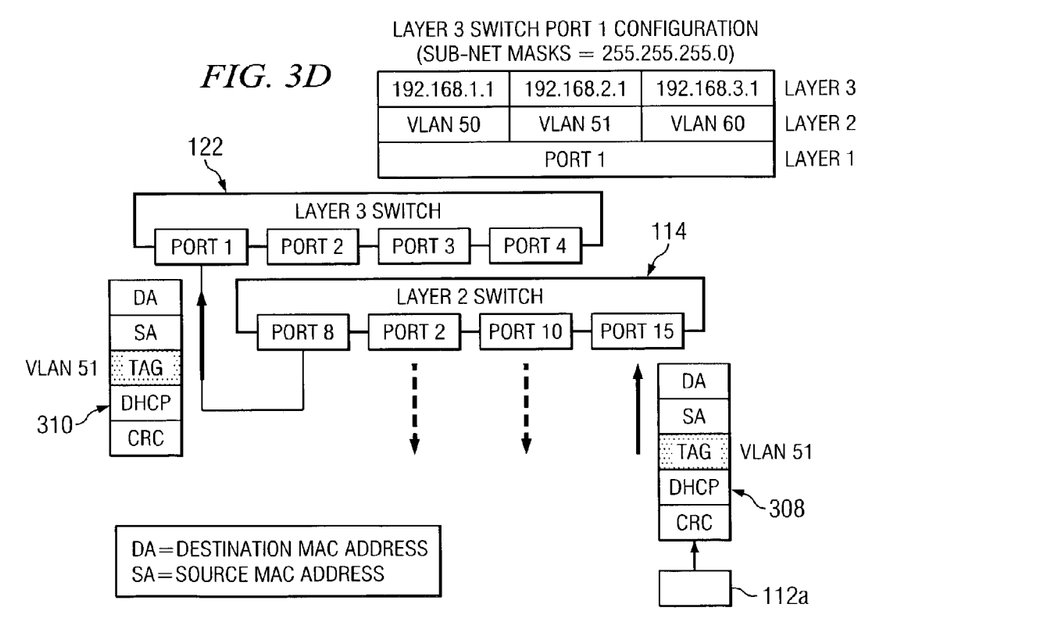
Figure 3E:
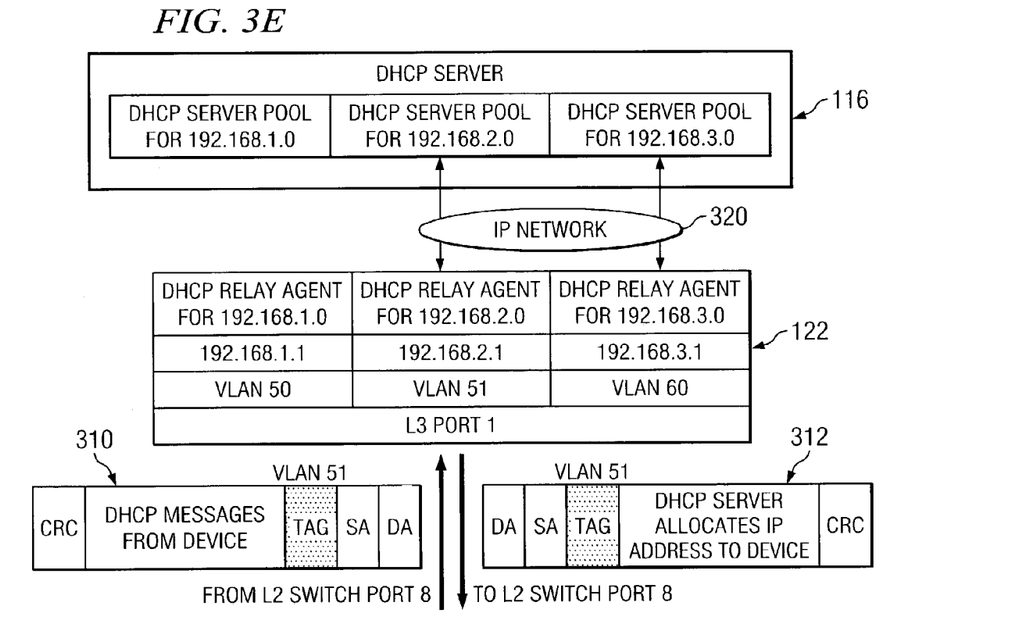
Figure 3F:
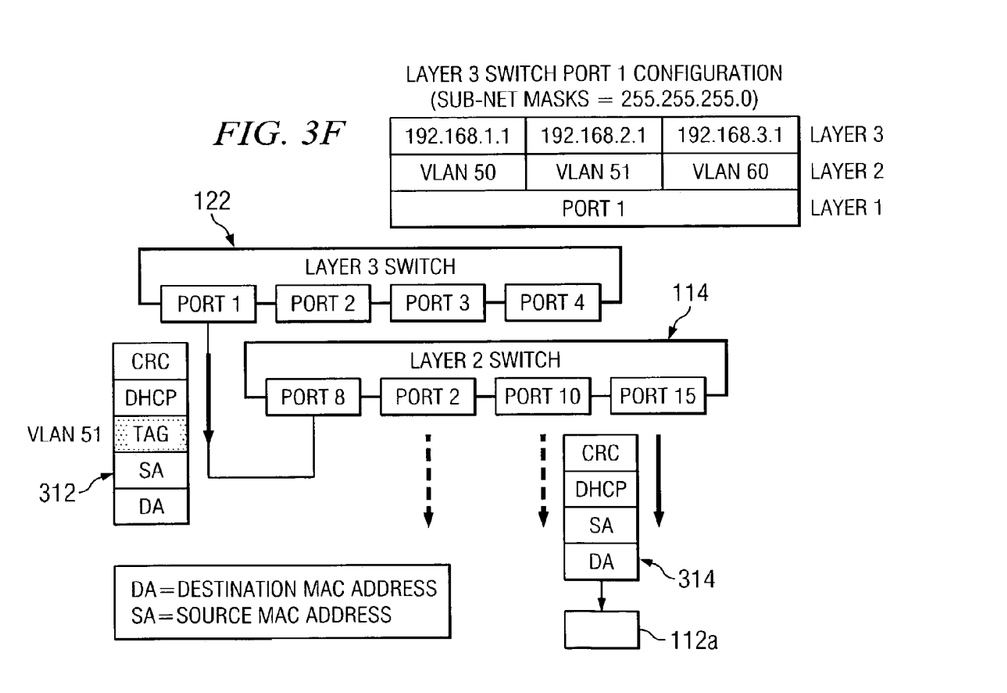

Now with reference to FIGS. 3D, 3E and 3F, for each VLAN ID, the network device 112a prepares and transmits a new discovery request message 308 in a frame tagged with one of the VLAN IDs. In other words, the network device 112a performs a second DHCP cycle—one for each VLAN ID previously received in the offer data message 306.

As shown in FIG. 3D, a new discover request message 308 (having VLAN ID=51) is transmitted from the network device 112a. Additional discover request messages (not shown) are similarly generated and transmitted for the other VLAN IDs (50, 60). Accordingly, three discovery request messages are received at the port (15) of the switch 114— one message tagged with VLAN ID=51, one message tagged with VLAN ID=50 (not shown), and another message tagged with VLAN ID=60 (not shown).

Due to the VLAN configuration of the switch 114, the port (15) only allows registered frames to pass through the port. Registered frames are those frames that are untagged, or tagged with the associated VLAN ID, and in this embodiment, the VLAN ID associated/configured with port (15) is VLAN ID=51, 60. Therefore, the discover request message tagged with VLAN ID=50 is discarded and not propagated through the switch 114, while the discover request messages tagged with VLAN ID=51 and VLAN ID=60 are accepted and delivered to the ports associated with VLAN ID=51 and VLAN ID=60, respectively. The further operation will only be described with respect to the discover request message 308 (VLAN ID=51).

The broadcast discover request message 308 is transmitted out all ports associated with VLAN 51, including the port (8), and output in the form of the discover request message 310 to the relay agent or switch 122. In this embodiment, the switch 122 receives a discovery request message with a VLAN tag. Now with reference to FIG. 3E, the discovery request message 310 received by the switch 122 is forwarded via a data network 320 to the network device 116 (with VLAN tag) using subnet information. Alternatively, the data network 320 may be omitted (direct connection) or may include additional devices interconnected therein. The switch 122 includes configuration information relating particular VLANs to corresponding subnets. When the discover request message 310 is forwarded to the network device 116, the subnet information is utilized to identify or associate a response from the network device 116 with the appropriated VLAN. As shown, the message 310 is forwarded on a specific subnet (192.168.2.0).

After receipt of the discover request message 310, the network device 116 responds by outputting an offer data message or frame (details not shown) to the switch 122 using the identified subnet information. The switch 122 associates the received message with VLAN 51, tags the message with the VLAN 51 tag and outputs a tagged offer data message 312, as shown. The offer data message 312 carries an IP address for use by the network device 112a.

Now referring to FIG. 3F, the offer data message 312 (tagged with VLAN 51) is transmitted from the switch 122 and received at the port (8) of the switch 114. The switch 114 removes the VLAN tag and outputs an offer data message 314 to the ports associated with VLAN 51, as shown (sent to multiple ports because it is a broadcast message). Alternatively, the VLAN tag may be left intact within the message and the message output to those ports associated with VLAN 51.

Because the offer data message 314 is generally untagged, the network device 112a distinguishes between the three original discovery request messages (VLAN ID=50, 51, 60) by transmitting them consecutively (with sufficient time to receive the data offer message in response) or assigning an xid to each discovery request message. Other methods may be employed to allow the network device 112a to associate the returned data offer message with the correct discovery request message.

Since only two of the three discover request messages are transmitted to the server 116 (i.e., one of three discover request messages (VLAN ID=50) failed to reach the server 116), the network device 112a can determine that the VLAN ID=51 or VLAN ID=60 is the appropriate VLAN ID for itself (the device should receive two offer data messages with IP addresses). Once determined, the network device 112a stores its VLAN ID in memory, associative to the VLAN for which it is a member.

As will be appreciated, for ports (of the switch 114) that include only one network device coupled thereto (as shown in the configuration of FIG. 1), the network device 112a utilizes the second DHCP cycle to determine the appropriate VLAN ID (as only one offer data message will be received and associated with one of the VLAN IDs). For ports (of the switch 114) that include a plurality of network devices coupled thereto (as shown in the configuration of FIG. 2), additional information may be utilized to determine which VLAN ID is the appropriate VLAN ID for the network device when the port is configured with at least two VLANs.

Additional methods may be employed that include identifying different types of VLANs for different types of network devices or configuring the VLANs for operation with one type of network device. For example, the VLAN information returned within the offer data message may delineate between voice and data VLANs, or some other categorization, such as shown in FIG. 3C where the VLAN ID=50, 51 are shown as alternate VLANs, as possibly voice VLANs, distinguished from the VLAN ID=60. It will be appreciated that the network devices may include configuration information identifying its type (e.g., data or voice) and select the appropriate VLAN IDs for proceeding with the second DHCP cycle to determine its VLAN ID.

In an alternative embodiment of the present invention, the VLAN ID information returned from the server 116 may be grouped into two classes—one class for data and one class for voice (voice VLANs). In this particular variation, the network devices 112 may be designed such to include information as to the class of network device (data or voice). If so, then the network device 112a would only send discovery request messages with VLAN ID=50 and VLAN ID=51 (not VLAN ID=60). Therefore, the network device 112a would be able to distinguish that VLAN ID=51 is the correct VLAN to which the device is configured.

Figure 4:
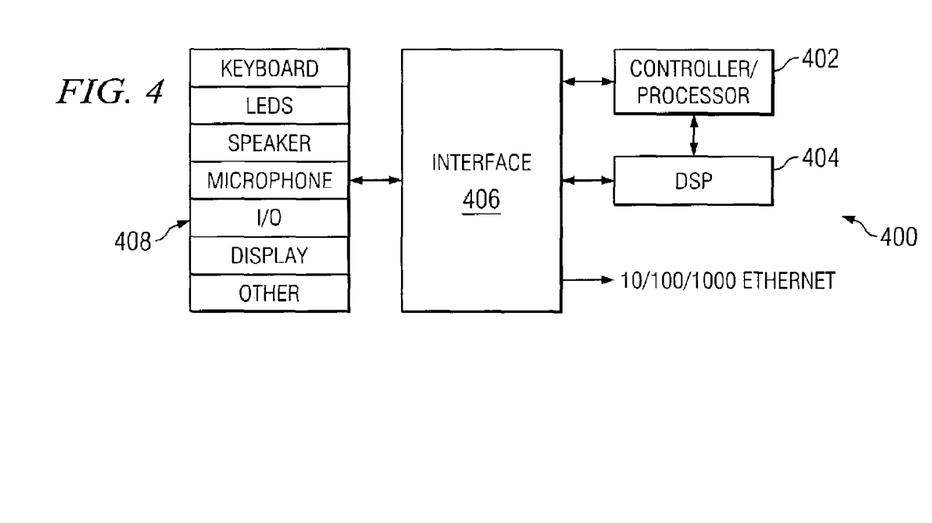
FIG. 4 is a block diagram illustrating an exemplary network device.

Now referring to FIG. 4, there is shown a block diagram illustrating an exemplary network device 400 (12, 112). The network device 400 includes a controller/processor 402 (and memory, not shown), a digital signal processor (DSP) 404, an interface 406 and input/output (I/O) devices 408. Input/output devices 408 are coupled to the interface 406 and generally include a keyboard, LEDS, an audio speaker, a microphone, a display, and additional input/output devices. The interface 406 further includes port connectivity, including a network interface card (not shown), such as for ethernet, for interfacing with one or more ports of the switch 14, 114 (see FIGS. 1 and 2) and sending/receiving data packets and data messages. The controller processor 402, the DSP 404 and the interface 406 are interconnected and provide the functionality for the network device 400 (12, 112). As will be appreciated, the network device 400 may include additional components and/or functionality. The network device 400 (including software) is operable in accordance with the methods and functions described herein.

The controller/processor 402 and DSP 404 are operable for having the network device 400 output a first discovery request for receipt by a second network device, receive a first data message in response to the first discovery message, the first data message comprising VLAN information relating to at least one predetermined VLAN within a network, and extract and save the VLAN information. The network device 400 is further operable for sending at least one second discovery message, the at least one second discovery message including a VLAN ID associated with at least one predetermined VLAN, and receiving a second data frame from the second network device in response to the at least one second discovery message.

Another embodiment of the present invention may be implemented as a computer program product for use with the method and apparatus described herein. Such implementation may include a series of instructions fixed on a tangible medium, such as a computer readable media (including, a diskette, CD-ROM, volatile memory, non-volatile memory, or fixed disk, or other memory devices), or fixed in a computer data signal transmittable or downloadable via a modem, data network or other interface device, such as a communications adapter connected to a network over a medium. The medium may be either wireline, wireless, optical, microwave, or other medium. The series of instructions embodies all or a portion of the functionality described herein with respect to the method and apparatus. Those skilled in the art will readily understand that such instructions may be written in a number of programming languages for use with many computer architectures, operating systems, and/or components.

It may be advantageous to set forth definitions of certain words and phrases that may be used within this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A method of programming a VLAN ID of a first network device connected to a network, the network having a predetermined number of VLANs, comprising:
   sending a first discovery message from the first network device, via a switch, to a second network device;
   receiving a first data frame from the second network device in response to the first discovery message, the first data frame comprising VLAN ID information relating to at least one predetermined VLAN; and
   extracting and saving the VLAN ID information, the VLAN ID information for use in determining the VLAN ID of the first network device.

2. A method in accordance with claim 1 further comprising:
   sending at least one second discovery message, the at least one second discovery message comprising a VLAN ID associated with the at least one predetermined VLAN; and receiving a second data frame from the second network device in response to the at least one second discovery message.

3. A method in accordance with claim 2 wherein the network comprises a plurality of VLANs, and the first data frame comprises VLAN ID information relating to a plurality of VLANs, and the sending of the at least one second discovery messages further comprises sending at least two messages, each of the messages including a VLAN ID associated with a respective one of the plurality of VLANS.

4. A method in accordance with claim 1 wherein the first discovery message is untagged, and the switch tags the first discovery message with a default VLAN ID of a port of the switch.

5. A method in accordance with claim 1 wherein the second network device is a Dynamic Host Configuration Protocol (DHCP) server.

6. A method in accordance with claim 1 wherein the first data frame comprises an OFFER request in accordance with Dynamic Host Configuration Protocol (DHCP).

7. A method of programming a VLAN ID of a first network device, comprising:
receiving a first discovery message from the first network device, via a switch, at a second network device;
outputting a first data frame from the second network device in response to the first discovery message, the first data frame comprising VLAN ID information relating to at least one predetermined VLAN, the VLAN ID information for use in determining the VLAN ID of the first network device.

8. A method in accordance with claim 1 further comprising;
receiving at least one second discovery message, the at least one second discovery message comprising a VLAN ID associated with the at least one predetermined VLAN; and
outputting a second data frame from the second network device in response to the at least one second discovery message.

9. A method in accordance with claim 8 wherein the first data frame comprises VLAN ID information relating to a plurality of VLANs, and the outputting of the at least one second discovery messages further comprises outputting at least two messages, each of the messages including a VLAN ID associated with a respective one of the plurality of VLANs.

10. A method in accordance with claim 7 wherein the first discovery message is tagged by a switch with a default VLAN ID of a port of the switch.

11. A method in accordance with claim 7 wherein first discovery message is received by, and the first data frame is output by, a Dynamic Host Configuration Protocol (DHCP) server.

12. A method in accordance with claim 7 wherein the first data message comprises an OFFER request in accordance with Dynamic Host Configuration Protocol (DHCP).

13. A system for programming a VLAN ID of a first network device, comprising:
a switch for receiving a first discovery message from the first network device;
a second network device for receiving the first discovery message from the switch, and in response thereto, outputting a first data frame for receipt by the first network device, the first data frame comprising VLAN ID information relating to at least one predetermined VLAN, the VLAN ID information for use in determining the VLAN ID of the first network device.

14. A system in accordance with claim 13 wherein the first data frame comprises VLAN ID information relating to a plurality of VLANs, and the switch further receives a plurality of second discovery messages from the network device, each of the plurality of second discovery messages including a VLAN ID associated with a respective one of the plurality of VLANs, and the second network device outputs at least a second data frame in response to at least a one of the plurality of second discovery messages.

15. A system in accordance with claim 14 wherein each of the first and second discovery messages comprise a DISCOVER request in accordance with Dynamic Host Configuration Protocol (DHCP), the first and second data messages comprise an OFFER request in accordance with DHCP, and the second network device comprises a server operable in accordance with DHCP.

16. A network device comprising a processor, the processor operable for having the network device:
output a first discovery request for receipt by a second network device;
receive a first data message in response to the first discovery message, the first data message comprising VLAN information relating to at least one predetermined VLAN within a network; and
extract and save the VLAN information, the VLAN information comprising a VLAN ID of a VLAN of which the network device is a member.

17. A device in accordance with claim 16, the processor further operable for having the network device:
send at least one second discovery message, the at least one second discovery message comprising a VLAN ID associated with at least one predetermined VLAN; and
receiving a second data frame from the second network device in response to the at least one second discovery message.

18. A device in accordance with claim 17, wherein the first data frame comprises VLAN ID information relating to a plurality of VLANs, and the sending of the at least one second discovery messages further comprises sending at least two messages, each of the messages including a VLAN ID associated with a respective one of the plurality of VLANs.

19. A device in accordance with claim 18, the device comprising a digital phone.

20. A device in accordance with claim 18 wherein each of the first and second discovery messages comprise a DISCOVER request in accordance with Dynamic Host Configuration Protocol (DHCP), the first and second data messages comprise an OFFER request in accordance with DHCP.

21. A method in accordance with claim 4 further comprising:
sending at least one second discovery message, the at least one second discovery message comprising a VLAN ID associated with the at least one predetermined VLAN;
receiving a second data frame from the second network device in response to the at least one second discovery message; and
wherein the first discovery message is untagged, and the switch tags the first discovery message with a default VLAN ID of a port of the switch.

* * * * *